(12) United States Patent
Karlsson et al.

(10) Patent No.: US 9,863,460 B2
(45) Date of Patent: Jan. 9, 2018

(54) TUNING STRUCTURE FOR GEAR SHIFT CABLES

(71) Applicant: VOLVO CAR CORPORATION, Gothenburg (SE)

(72) Inventors: Linda Karlsson, Fjaras (SE); Thomas Lundahl, Svenljunga (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/070,866

(22) Filed: Nov. 4, 2013

(65) Prior Publication Data

US 2014/0130632 A1 May 15, 2014

(30) Foreign Application Priority Data

Nov. 15, 2012 (EP) ..................... 12192765

(51) Int. Cl.
*F16C 1/22* (2006.01)
*F16C 1/10* (2006.01)
(Continued)

(52) U.S. Cl.
CPC .............. *F16C 1/108* (2013.01); *F16C 1/262* (2013.01); *F16H 59/0208* (2013.01);
(Continued)

(58) Field of Classification Search
CPC .... Y10T 74/20402; Y10T 74/2045–74/20462; F16C 1/10;
(Continued)

(56) References Cited

U.S. PATENT DOCUMENTS 4,386,755 A * 6/1983 Bennett ............. B29C 45/14598
249/83
4,406,177 A 9/1983 Bennett et al.
(Continued)

FOREIGN PATENT DOCUMENTS

EP 1312838 A2 5/2003
FR 2847957 A1 * 6/2004 .............. F16C 1/106
(Continued)

OTHER PUBLICATIONS

Machine Translation of FR 2847957, obtained Jul. 29, 2016.*
(Continued)

*Primary Examiner* — Richard W Ridley
*Assistant Examiner* — Brian McGovern
(74) *Attorney, Agent, or Firm* — Brooks Kushman P.C.

(57) ABSTRACT

A shift cable for transmitting of operation commands to a transmission comprises a cable conduit, an inner cable, a socket and a shift tuning structure. The socket is adapted to attach the shift cable to a housing. The shift tuning structure is provided between the cable conduit and the socket in order to provide a vibration dampening between the inner cable and the socket and to provide a desired shift feeling when the inner cable is transmitting an operation command. The shift tuning structure comprises a stiff, low-density material which is separated from the socket in axial and radial directions through a flexible material, which is thinner than the stiff, low-density material.

24 Claims, 3 Drawing Sheets

(51) Int. Cl.
*F16H 59/02* (2006.01)
*F16H 61/36* (2006.01)
*F16C 1/26* (2006.01)
*F16H 61/24* (2006.01)

(52) U.S. Cl.
CPC .......... *F16H 61/36* (2013.01); *F16C 2361/65* (2013.01); *F16H 61/24* (2013.01); *Y10T 74/20462* (2015.01)

(58) Field of Classification Search
CPC . F16C 1/101–1/105; F16C 1/108; F16C 1/12; F16C 1/14; F16C 1/145; F16C 1/26; F16C 1/262; F16H 61/24; F16H 61/36; F16H 59/0208
See application file for complete search history.

(56) References Cited

U.S. PATENT DOCUMENTS

| | | | | |
|---|---|---|---|---|
| 5,884,531 | A * | 3/1999 | Koenig | ................... F16C 1/108 74/500.5 |
| 6,189,408 | B1 * | 2/2001 | Scheidling et al. | ......... 74/502.4 |
| 6,499,909 | B1 | 12/2002 | Scheidling et al. | |
| 2005/0186024 | A1 * | 8/2005 | Ruhlander | .............. F16C 1/105 403/122 |
| 2006/0053943 | A1 | 3/2006 | Motonaga et al. | |
| 2007/0144302 | A1 * | 6/2007 | Graham | ........................ 74/502.5 |
| 2007/0238334 | A1 * | 10/2007 | Prat Terradas et al. | ...... 439/141 |
| 2008/0196531 | A1 * | 8/2008 | Ruhlander | .............. F16C 1/105 74/473.15 |
| 2011/0056325 | A1 | 3/2011 | Cho et al. | |
| 2011/0290949 | A1 * | 12/2011 | Trouv | ..................... F16C 1/105 248/65 |

FOREIGN PATENT DOCUMENTS

| | | |
|---|---|---|
| JP | 2004278668 | 10/2004 |
| JP | 2004278668 A | 10/2004 |
| JP | 2008019977 A | 1/2008 |
| WO | 9823874 A1 | 6/1998 |

OTHER PUBLICATIONS

Extended European Search Report Dated Apr. 9, 2013, Application No. 12192765.1-1752, Applicant Volvo Car Corporation, 5 Pages.
Chinese Search Report Dated Oct. 19, 2016, Application No. 201310559659.6, 2 Pages.
Chinese First Office Action Dated Oct. 28, 2016, Application No. 201310559659.6, Applicant Volvo Car Corporation, 6 Pages.
Chinese Second Office Action Dated Apr. 1, 2017, Application No. 201310559659.6, Applicant Volvo Car Corporation, 5 Pages.

* cited by examiner

TUNING STRUCTURE FOR GEAR SHIFT CABLES

CROSS-REFERENCE TO RELATED APPLICATIONS

This application claims foreign priority benefits under 35 U.S.C. §119(a)-(d) to European patent application number EP 12192765.1, filed Nov. 15, 2012, which is incorporated by reference in its entirety.

TECHNICAL FIELD

The present disclosure relates to the field of transmissions and especially the field of gear shift cables of a transmission.

BACKGROUND

A transmission equipped vehicle has a gear shift lever that transmits an operation command to the transmission through a gear shift cable. During use of the transmission vibrations occur, e.g., in the transmission housing. These vibrations cause noise that may travel from the transmission housing to the shift cable and into the passenger compartment of the vehicle through the gear shift lever. Thereby the driver and passengers experience an unwanted noise and unpleasant vibrations through the gear shift lever. A commonly used method to avoid this problem is to add a mass damper to the shift cable. However, this increases the weight of the vehicle and other solutions are thus preferred. It is also common to use tuning structures in the transmission cable comprising an inner cable and a cable conduit and controlling the rigidity of such tuning structure.

US 2006/0053943 discloses a transmission cable comprising an outer tube and an inner cable accommodated in the outer tube. The inner cable is connected in one end to a shift arm through a rubber bush, i.e., a tuning structure, which may elastically deform to inhibit the transfer of vibrations through the cable. The rigidity of the rubber bush is set so that it is lower in a direction of pushing the inner cable than in a direction of pulling the inner cable.

US 2011/0056325 discloses a noise reduction apparatus comprising a cable connection pipe that has one side connected to a shift lever sided end of an outer cable of the shift cable and a damper housing that has one end coupled to a shift lever-sided end of a cable connection pipe by a first antivibration member therein and the other side thereof elastically coupled to the shift lever mounting bracket in a mounting socket by a second antivibration member. The two antivibration members, e.g., rubber, reduce vibration at the damper housing and the mounting socket and hence dampen the vibrations transmitting to the gear shift lever.

The problems with the solutions according to the prior art is that using a soft material in the antivibration member may cause the shift feeling to be lost and using a stiff material may cause vibrations to be transmitted. Other solutions may be bulky, difficult to manufacture and expensive. Hence, there is a need for an improved damper that may reduce vibration noise without losing the good gear shift feeling.

SUMMARY

An object of the present disclosure is to provide an inventive damper for gearshift cables where the previously mentioned problems are partly avoided.

Further advantages are achieved by implementing one or several of the features of the dependent claims.

The disclosure relates to a shift cable for transmitting operation commands to a manual or automatic transmission. The shift cable comprises a cable conduit, an inner cable, a socket and a shift tuning structure, wherein the socket is adapted to attach the shift cable to a housing. The socket may be connected upon the transfer housing via a clamp/screw connection. The shift tuning structure is provided between the cable conduit and the socket in order to provide a vibration dampening between the inner cable and the socket. It further provides a desired shift feeling when the inner cable is transmitting a operation command i.e., a feeling that the shift lever is rapidly responding to the drivers command.

The shift tuning structure comprises a stiff, low-density material which is separated from the socket in axial and radial directions through a flexible material. The flexible material is thinner than the stiff, low-density material. The stiff, low-density material will ensure that a good shift feeling is maintained during gear shifting, i.e., that the response of the movement of the inner cable as felt in the gear shift lever is accurate and direct. Hence, the mushy shift feeling, i.e., a slow gear shift response that may arise when antivibration material of lower density, such as rubber, is used in the socket is avoided. The thin flexible material reduces the transfer of vibrations from the transmission house to the shift cable when the inner cable is unloaded. The combination of stiff, low-density material and thin flexible material hence increases the overall operation of the shift gear.

The stiff, low-density material referred to in this disclosure is a material that is stiff in relation to the compression forces actuated upon it when a gear is shifted and the inner cable is transmitting an operational command. Preferably, the density of the stiff, low-density material is 1000-2000 kg/m3 and most preferably 1100-1500 kg/m3. The material is preferably a polymeric material. Polyoxymethylenes (e.g., Delrin) and polyamides (e.g., nylon) are examples of suitable stiff, low-density materials but other materials with similar properties may also be used. However, the preferred stiff, low-density material has a density lower than steel, but higher than other commonly used attenuation materials such as rubber. Thereby, using the stiff, low-density material according to the present disclosure maintains the desired shift feeling of accurate and responsive shifting better than commonly used attenuation materials.

The shift tuning structure according to the present disclosure is considerably lighter than the mass dampers that are commonly used on the shift cable to reduce vibrations. Thereby, the weight of the shift cable according to the present disclosure is beneficial over weight damper solutions.

The flexible material referred to in this disclosure is a material that is flexible in the meaning that it is compressed by the forces actuated upon it when a gear is shifted and the inner cable transmits an operational command. Hence, it dampens the movement of the shift cable and reduces vibration transfer between the inner cable and the socket. The dampening effect is achieved with a thin layer of such a flexible material delineating the stiff, low density material from the socket. Silicon and rubber are example of a suitable material in the thin flexible material.

The end of the cable conduit is preferably provided with a radial flange and the shift tuning structure is then provided on each side of the radial flange. The radial flange may also be integrated with the cable conduit. An extension of the flange may mount the flange to the cable conduit. The radial flange is provided with a protrusion on the side opposite the extension. The radial flange enables the mounting of the shift tuning structure to the cable conduit as the shift tuning structure may be mounted directly onto the radial flange and onto the protrusion during the production. The radial flange facilitates transfer of forces during gear shifting from the cable conduit via the flange to the shift tuning structure in axial direction by enabling a large axial contact surface.

A swivel tube is arranged to abut the protrusion of the flange, such that the inner cable is not in direct contact with the shift tuning structure. Further, there is a thin layer of air between the swivel tube and the shift tuning structure. The swivel tube directs the inner cable such that it passes the shift tuning structure and out through the opening of the socket.

The flexible material may be moulded onto or provided as a separate part to the stiff, low-density material. As an example, a thin layer of silicon may be moulded directly onto nylon used as a stiff, low-density material. The assembly of the shift tuning structure in the socket is simplified as it requires fewer steps and less risk of misalignment of the shift tuning structure components in the socket. The production process is thereby shortened and simplified. Other materials meeting the invention specification is just as suitable.

The flexible material may be film like at least in a radial direction and thicker at least in an axial direction in between the stiff, low-density material and the socket. Because the flexible material is compressed in the axial direction during a shift operation, it is preferred that the flexible material is thicker in the axial direction, in order to maintain a vibration dampening also during a shift operation. The tuning structure is not subjected to any relevant radial forces, whereby the flexible material can be thinner in the radial direction and still maintain its dampening effect. Therefore the flexible material is thicker in the axial direction than in the radial direction.

The stiff, low-density material may be fully covered by the flexible material, i.e., a thin flexible layer separates the stiff, low density material from both the socket and the cable conduit. This facilitates a simple production of the shift tuning material. The stiff, low-density material may be manufactured in separate pieces, each covered in flexible material and assembled onto the flange of the cable conduit. If the stiff, low-density material is fully covered by the flexible material it will also further improve the dampening effect.

The socket may fully enclose the tuning structure and the inner diameter of the socket is slightly larger than the outer diameter of the shift tuning structure, such that a thin air layer is enabled between the inner surface of the socket and an outer surface of the shift tuning structure. The thin air layer inhibits contact, or at least minimizes the contact, between the tuning structure and the socket. Vibrations from the socket may thereby not be transmitted to the cable conduit during a neutral gear shift position because vibrations will not be transmitted to the tuning structure over the thin air layer. Hence, the thin air layer will act as an additional vibration dampening barrier and reduce the transfer of noise and vibration from the transmission housing to the passenger compartment via the shift cable. Therefore, a more pleasant driving experience is achieved.

Further a thin air layer may also be provided between the axial surfaces of the flexible material and the socket, when the tuning structure is in an unloaded state. The air layer is adjusted such that it is so thin, that it does not impact the distinct shift feeling. The tuning structure and the socket will abut in an axial direction only when a shifting force acts upon the shift cable, whereby no vibrations can be transferred to the shift cable from the transmission housing. Further, the thin air layer minimizes the contact between the shift tuning structure and the socket when the tuning structure is unloaded, and thereby reduces the transfer of vibrations. The presence of a thin air layer will act as an additional vibration dampening barrier and reduce the transfer of noise into the passenger compartment.

The flexible material may be provided with distance elements, in the same flexible material. The distance elements are adapted such, that they uphold the thin air layer, when the tuning structure is in an unloaded state. These distance elements help to distance the shift tuning structure from the socket when there is no tension in the inner cable, i.e., the shift tuning structure is in an unloaded state. The distance elements are thus the contact between the socket and the tuning structure. The distance elements are thereby design to have a small contact area to the socket and thin body. The distance elements can for example be pin- or rib-shaped. The thin body of the distance elements assures a low transfer of vibrations through the distance elements. Distance elements can be arranged to uphold both a radial and/or an axial air layer.

The thin flexible material may be provided with axial sleeve like extensions provided between each opening of the socket and the flange/cable conduit and the swivel tube respectively, i.e., provided at the contact surfaces where the cable conduit enters the socket and the inner cable exits the socket. The cable conduit and the inner cable are thus not in direct contact with the socket. The axial sleeve like extensions, made of thin flexible material, will reduce transfer of vibration and noise from the socket to the cable conduit and inner cable.

Embodiments of the disclosure are suitable for automatic as well as manual transmissions.

BRIEF DESCRIPTION OF THE DRAWINGS

Embodiments according to the present disclosure will now be described in detail with reference to the attached drawings.

DETAILED DESCRIPTION

In the following two embodiments are shown and described, simply by way of illustration of two modes of carrying out the invention.

Figure 1:
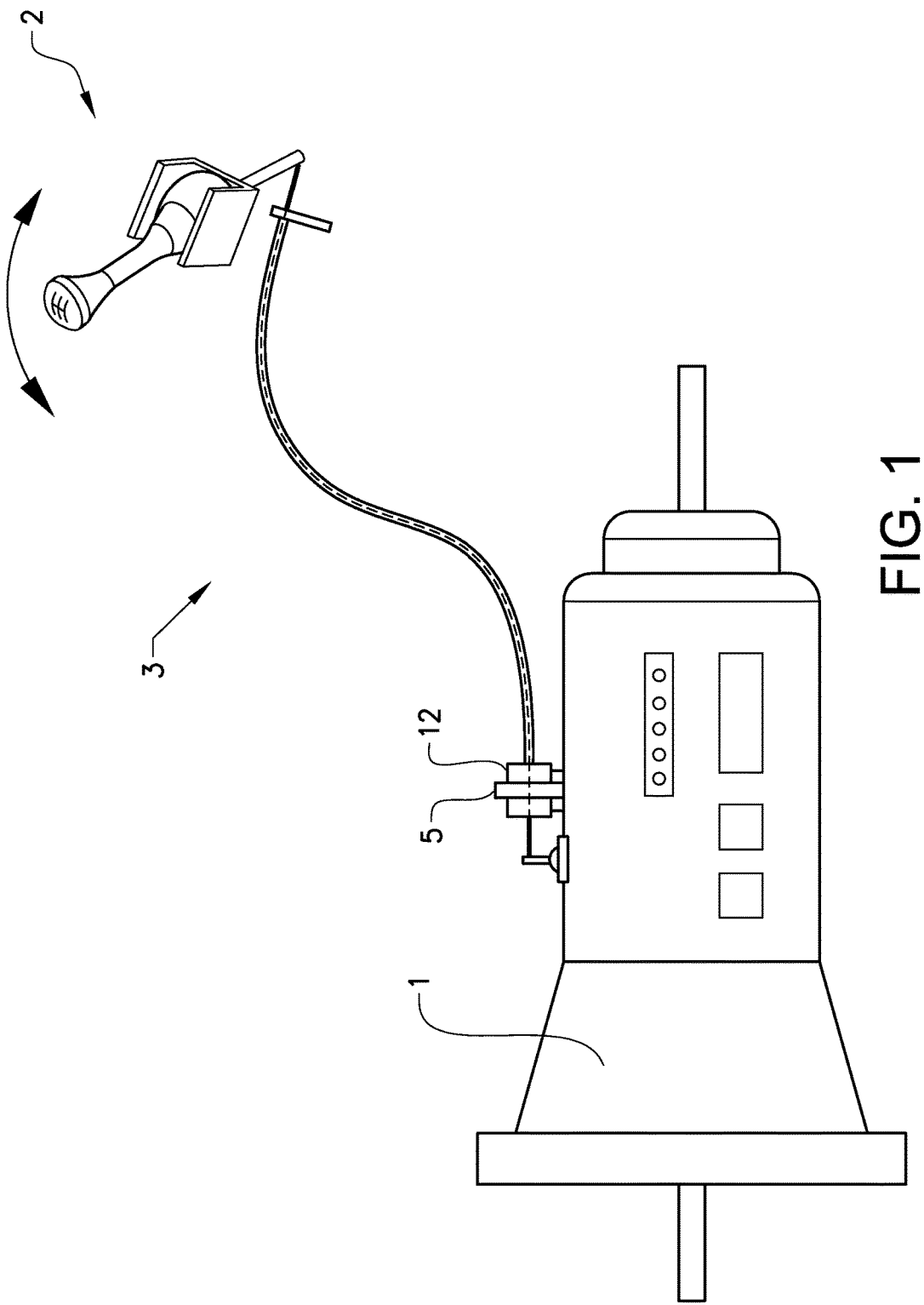
FIG. 1 shows a schematic view of a transmission according to the disclosure.
Figure 2:
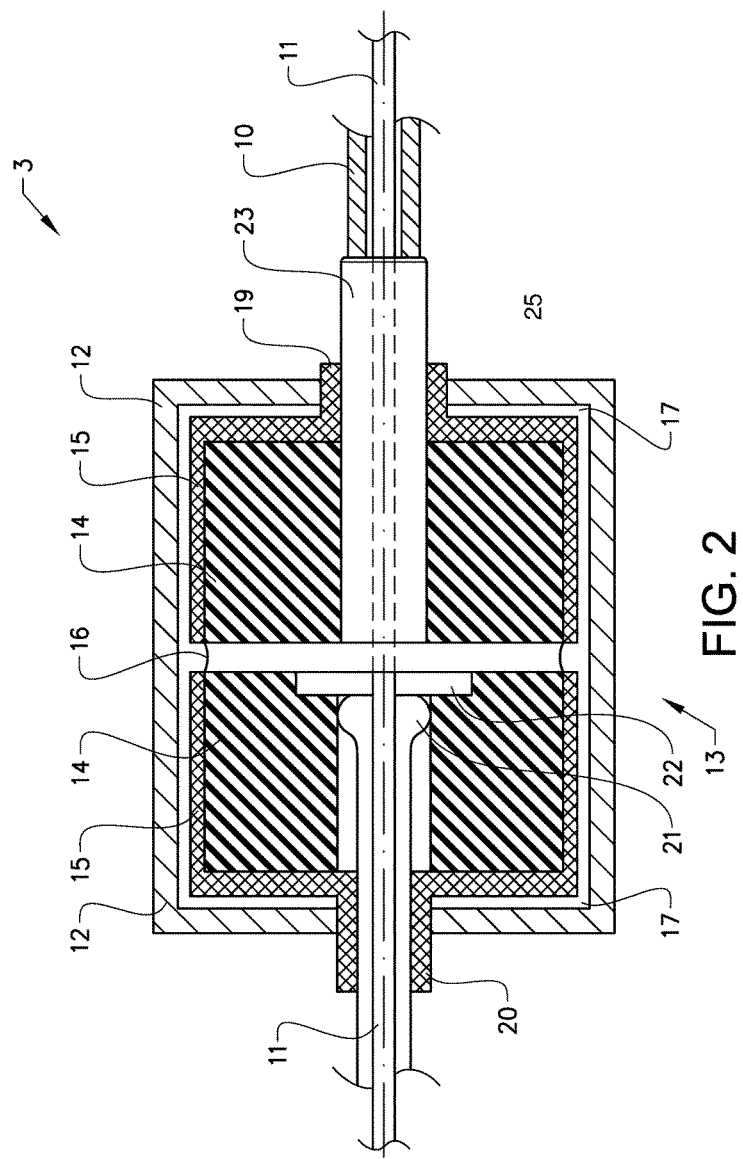
FIG. 2 shows a schematic cross section side view of a shift cable according to the disclosure.
Figure 3:
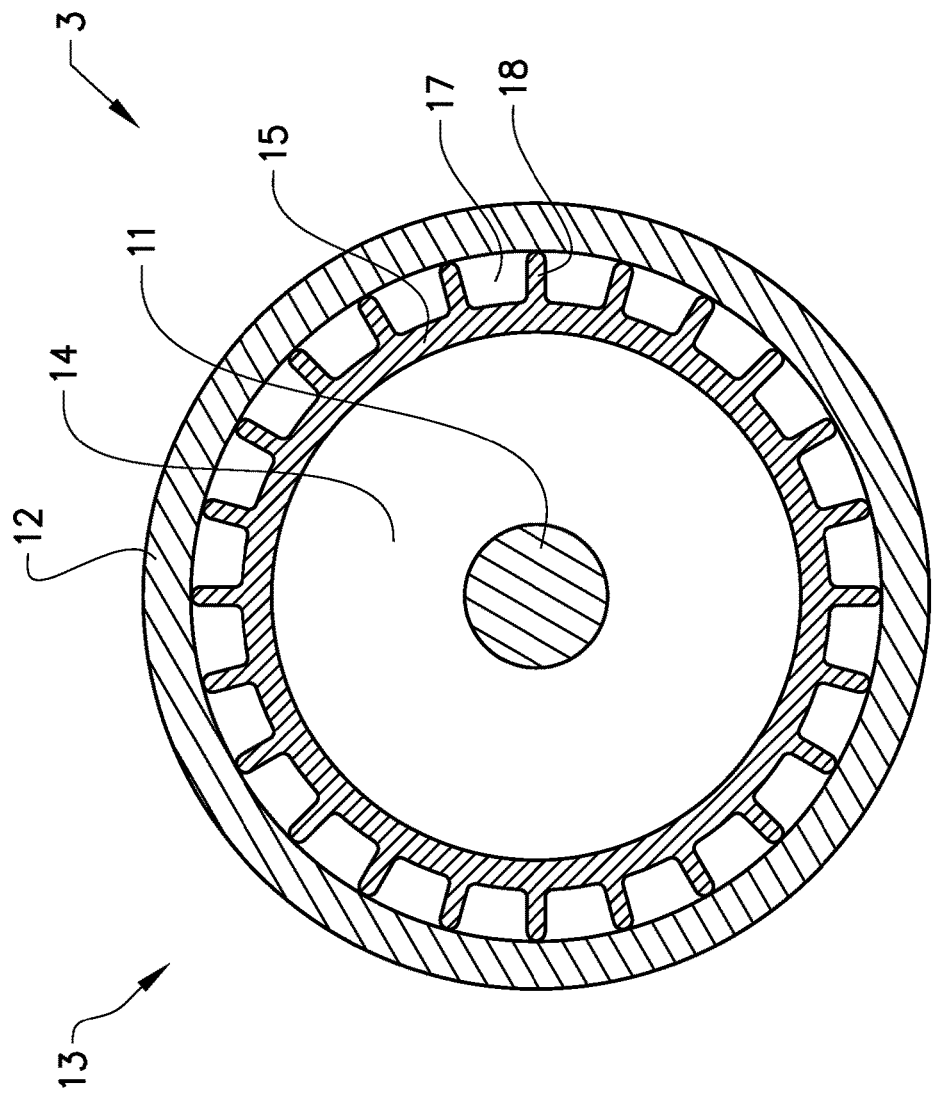
FIG. 3 shows a schematic cross section front view of a shift cable according to the disclosure.

The inventive shift cable 3 is now described in conjunction with FIGS. 1-3. FIG. 1 shows a shift cable 3 which transmits operation commands, such as shifting gears, from a gear lever 2 to a transmission 1. The gear lever 2 is operated by a driver in the driver compartment (not shown). The shift cable 3 comprises a cable conduit 10, an inner cable 11, a socket 12 and a shift tuning structure 13 inside the socket 12. These will be further described in conjunction with FIG. 2. The shift cable 3 is attached upon the housing of the transmission 1 via the socket 12 and a clamp/screw connection 5.

A cross sectional view of a preferred embodiment of the shift cable 3, in an unloaded state, is shown in FIG. 2. The shift cable 3 comprises a cable conduit 10, an inner cable 11 passing through the cable conduit 10, a socket 12 which is arranged at the end of the cable conduit 10 and a shift tuning structure 13 comprised within the socket 12. A radial flange 16 is arranged, via an extension 23, at the end of the cable conduit 10. The shift tuning structure 13 is arranged on both sides of the radial flange 16, within the socket 12. The socket 12 is adapted to attach the shift cable 3 to a housing of a transmission (shown in FIG. 1).

The flange is provided with a protrusion 22 on the side opposite the extension 23. A swivel tube 21 is arranged to abut the protrusion 22. The inner cable 11 is arranged to pass through the swivel tube 21. The swivel tube 21 holds the position of the shift tuning structure relative the inner cable 11 as the inner cable 11 exits the socket 12. Thereby the inner cable 11 can move freely within the swivel tube 21. The use of a swivel tube 21 is known and is therefore not further described. A thin layer of air is present between the stiff, low-density material 14 of the shift tuning structure 13 and the swivel tube 21.

The shift tuning structure 13 is provided between the flange 16 and the socket 12 in order to provide vibration dampening between the inner cable 11 and the socket 12 and a desired and distinct shift feeling when the inner cable 11 is transmitting an operation command.

In the embodiment shown in FIG. 2 the cable conduit 10 is provided with a flange 16 which extends in radial direction. The radial flange 16 is arranged to attach to the cable conduit 10 via an extension 23. The extension 23 facilitates the mounting of the flange 16 to the cable conduit 10. In another embodiment the radial flange 16 may be an integrated part of the cable conduit 10. Further, the extension 23 of the flange 16 may extend through the opening of the socket 12 or may be fully enclosed within the socket 12. The shift tuning structure 13 extends in axial direction on each side of the radial flange 16. The radial flange 16 facilitates an axial force transfer from the cable conduit 10 to the shift tuning structure 13 when a shift operation command is actuated by providing a large axial contact surface between the cable conduit 10 and the shift tuning structure 13.

The shift tuning structure 13 comprises a stiff, low-density material 14 which is separated from the socket 12 in axial and radial directions through a flexible material 15. The combination of properties of the stiff, low-density material 14 and the thin flexible material 15 provides an efficient dampening effect and provides the distinct shift feeling. The stiff, low-density material 14 is not compressible by the forces applied upon it during a shifting operation, i.e., provides a distinct shift feeling. However, due to its low density properties, the stiff, low-density material 14 is also a decent vibration dampener. However, the vibration dampening properties of the shift tuning structure 13 are increased by the flexible material 15 and the air layer 17.

As shown in FIG. 2 the flexible material 15, separating the stiff, low-density material 14 from the socket 12, is substantially thinner than the stiff, low-density material 14. The low-density material 14 fills most of the socket 12 space, whereas the flexible material 15 encloses the low-density material 14 acting as a lining between the stiff, low-density material 14 and the socket 12. The flexible material 15 is film-like in radial direction and thicker in axial direction in between the stiff, low-density material 14 and the socket 12.

The flexible material 15 is thicker in the direction parallel to the direction in which a force is exerted by the inner cable 11, when a shifting operation command is transmitted. The flexible material is thereby compressed in axial direction when a shifting force is actuated (not shown in FIG. 2), whereby the flexible material 15 must have a sufficient thickness in axial direction in order to keep its vibration dampening properties during compression.

The flexible material 15 is further provided with an axial sleeve like extension 19 between an opening in a radially extending end wall 25 of the socket 12 and the extension 23 of the flange 16. Furthermore, the sleeve extension 19 extends into the opening such that the sleeve extension 19 is positioned between the radially extending end wall 25 and the inner cable 11 without the stiff, low-density material 14 being positioned between the sleeve extension 19 and the inner cable 11. A similar sleeve like extension 20 of the thin flexible material 15 is also provided between the swivel tube 21 and the socket 12. These extensions 19, 20 prevent the socket 12 from being in direct contact with the flange extension 23, the cable conduit 10 or the swivel tube 21, and thereby reduce transfer of vibrations from the socket 12 to the cable conduit 10. Hence, less vibrations and noise are transmitted from the transmission 1 to the shift cable 3 and into the passenger compartment. The driving experience it thus improved.

The stiff, low-density material 14 enables an accurate and rapid response to a operational command transmitted by the shift cable 3 and also achieves some vibration dampening through it low density properties. The flexible material 15, separating the stiff, low-density material 14 from the socket 12, will however further reduce the vibration transfer by damping the contact between the low-density material 14 and the socket 12.

Further, the socket 12 encloses the shift tuning structure 13 such that the inner diameter of the socket 12 is larger than the outer diameter of the shift tuning structure 13. Thereby a thin air layer 17 is enabled between the inner surface of the socket 12 and the outer surface of the shift tuning structure 13 in both axial and radial directions, as seen in the embodiment shown in FIG. 2. The thin flexible material 15 of the shift tuning structure 13 is therefore not directly in radial contact with the socket 12 when the shift cable 3 is in a neutral position and there is no tension in the inner cable. The thin air layer 17 will act as a vibration transfer barrier between the tuning structure 13 and the socket 12, thereby inhibiting vibrations to be lead from the socket 12 to shift tuning structure 13 and hence to the cable conduit 10 when the shift tuning structure is in an unloaded state. The air layer 17 thus contributes to excellent dampening characteristics of the inventive shift cable 3. In the disclosed embodiment a thin air layer 17 is also foreseen in axial direction, whereby, when the shift tuning structure 13 is under load, i.e., a shift command is executed; shift tuning structure 13 obviously is in axial contact with the socket 12.

When an operational command is transmitted from the shift cable 3 to the transmission 1 there will be operating force transmitted in the inner cable 11. The shift tuning structure 13 will counteract the operating force enabling a movement of the inner cable 11 relative the cable conduit 10, whereby the shift tuning structure 13 abuts the socket 12 in axial direction (not shown in the figures).

In one embodiment, shown in FIG. 3, the flexible layer 15 is provided with distance elements 18 adapted to uphold the thin air layer 17 between the flexible layer 18 and the socket 12, when the tuning structure 13 is in an unloaded state. FIG. 3 merely shows the principal of how the thin air layer 17 may be upheld, and conclusions cannot be drawn from other details possibly shown in FIG. 3. By providing distance elements 18 to the flexible layer 15, the contact point of the shift tuning structure 13 will be minimized in an unloaded state of the shift tuning structure. The distance elements 18 do not just minimize the contact area, but also improve the dampening effect. Hence, the distance elements 18 improve the dampening effect of the shift tuning structure 13. The shift cable 3 is seen from an axial cross sectional front view in FIG. 3.

The disclosure is not limited to the specific embodiments presented, but includes all variations within the scope of the present claims.

As will be realized, the disclosure is capable of modification in various obvious respects, all without departing from the scope of the appended claims. Accordingly, the drawings and the description thereto are to be regarded as illustrative in nature, and not restrictive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift cable for transmitting operation commands to a transmission, the shift cable comprising:
    a cable conduit;
    an inner cable;
    a socket adapted to attach the shift cable to a housing; and
    a shift tuning structure provided between the cable conduit and the socket in order to provide vibration dampening between the inner cable and the socket and to provide a shift feeling when the inner cable transmits an operation command, wherein the shift tuning structure comprises a stiff material which is separated from the socket in an axial direction and a radial direction by a flexible material, which is more flexible than the stiff material and thinner than the stiff material in the axial direction where the flexible material is positioned between the stiff material and the socket in the axial direction, wherein the stiff material is contained entirely within the socket and the flexible material is positioned between the stiff material and the socket along an entire axial length of the stiff material such that the flexible material extends radially between the stiff material and the socket along the entire axial length of the stiff material, and wherein, along the entire axial length of the stiff material, the flexible material is thinner in the radial direction.

2. The shift cable according to claim 1 wherein the cable conduit is provided with a radial flange having a first side and a second side, and wherein the shift tuning structure is provided on each side of the radial flange.

3. The shift cable according to claim 2 wherein the flexible material is moulded onto, or provided as a separate part to, the stiff material.

4. The shift cable according to claim 1 wherein the flexible material has a first thickness in the radial direction and a second thickness in the axial direction in between the stiff material and the socket, wherein the second thickness is thicker than the first thickness.

5. The shift cable according to claim 1 wherein the stiff material is covered by the flexible material such that the flexible material separates the socket from both the stiff material and the cable conduit.

6. The shift cable according to claim 1 wherein the socket fully encloses a portion of the tuning structure, and wherein the socket has an inner diameter that is larger than an outer diameter of the portion of the tuning structure, such that an air layer is enabled between an inner surface of the socket and an outer surface of the portion of the tuning structure.

7. The shift cable according to claim 1 wherein the socket fully encloses a portion of the tuning structure, and an air layer is provided between axial surfaces of the flexible material and the socket.

8. The shift cable according to claim 1 wherein the socket encloses a portion of the tuning structure, and wherein an air layer is enabled between an inner surface of the socket and an outer surface of the portion of the tuning structure.

9. The shift cable according to claim 8 wherein the flexible material is provided with radially extending distance elements adapted such that the distance elements uphold the air layer when the tuning structure is in an unloaded state.

10. The shift cable according to claim 1 wherein the socket has two openings, and the flexible material is provided with axial sleeve extensions that each extend into a respective one of the two openings such that each extension is positioned between the socket and the inner cable, and wherein each extension extends axially outside of the socket.

11. The shift cable according to claim 1 wherein the socket includes a radially extending end wall having an opening that receives the inner cable, and the flexible material has an axially extending sleeve extension that extends into the opening such that the sleeve extension is positioned between the radially extending end wall and the inner cable without the stiff material being positioned between the sleeve extension and the inner cable.

12. The shift cable according to claim 1 wherein the stiff material has a higher density than the flexible material, but a lower density than steel.

13. The shift cable according to claim 1 wherein the socket includes first and second radially extending end walls that each have a respective opening that receives the inner cable, and the flexible material has first and second axially extending sleeve extensions that each extend into a respective one of the respective openings such that each sleeve extension is positioned between one of the radially extending end walls and the inner cable without the stiff material being positioned between the sleeve extension and the inner cable.

14. The shift cable according to claim 1 wherein the flexible material has a uniform thickness along the entire axial length of the stiff material.

15. The shift cable according to claim 1 wherein the flexible material comprises a circumferential layer, and multiple spaced-apart distance elements that extend radially outwardly from the circumferential layer and contact the socket.

16. A shift cable for transmitting operation commands to a transmission, the shift cable comprising:
    a cable conduit;
    an inner cable that passes through the cable conduit;
    a socket that is attachable to a housing of the transmission; and
    a shift tuning structure provided between the cable conduit and the socket in order to provide vibration dampening between the inner cable and the socket and to provide a shift feeling when the inner cable transmits an operation command, wherein the shift tuning structure comprises a first material and a second material disposed between the first material and the socket in an axial direction and a radial direction, wherein the second material is more flexible than the first material and thinner than the first material in the axial direction where the second material is positioned between the first material and the socket in the axial direction, wherein the first material is contained entirely within the socket and the second material is positioned between the first material and the socket along an entire axial length of the first material such that the second material overlaps the first material along the entire axial length of the first material, and wherein, along the entire axial length of the first material, the second material is thinner in the radial direction.

17. The shift cable according to claim 16 wherein the second material comprises a circumferential layer, and multiple spaced-apart distance elements that extend radially outwardly from the circumferential layer and contact the socket.

18. A shift cable and transmission combination comprising:
   a transmission having a housing; and
   a shift cable for transmitting operation commands to the transmission, the shift cable including:
      a cable conduit;
      an inner cable that passes through the cable conduit;
      a socket attached to the housing; and
      a shift tuning structure provided between the inner cable and the socket in order to provide vibration dampening between the inner cable and the socket and to provide a shift feeling when the inner cable transmits an operation command, the shift tuning structure comprising a first material and a second material that separates the first material from the socket in an axial direction and a radial direction, wherein the second material is more flexible than the first material and thinner than the first material in the axial direction where the second material is positioned between the first material and the socket in the axial direction, wherein the first material is contained entirely within the socket and the second material is positioned between the first material and the socket along an entire axial length of the first material such that the second material overlaps the first material along the entire axial length of the first material, and wherein, along the entire axial length of the first material, the second material is thinner in the radial direction.

19. The combination of claim 18 wherein the socket is attached to the housing via a clamp/screw connection.

20. The combination of claim 18 wherein the cable conduit is provided with a radial flange having first and second sides, and wherein the shift tuning structure is provided on each side of the radial flange.

21. The combination of claim 18 wherein the second material has a first thickness in the radial direction in between the first material and the socket, and a second thickness in the axial direction in between the first material and the socket, and wherein the second thickness is thicker than the first thickness.

22. The combination of claim 18 wherein the socket encloses a portion of the second material, and wherein the socket has an inner diameter that is larger than an outer diameter of the portion of the second material, such that an air layer is enabled between an inner surface of the socket and an outer surface of the portion of the second material.

23. The combination of claim 18 wherein the socket includes a radially extending end wall having an opening that receives the inner cable, and the second material has an axially extending sleeve extension that extends into the opening such that the sleeve extension is positioned between the radially extending end wall and the inner cable without the first material being positioned between the sleeve extension and the inner cable.

24. The combination of claim 18 wherein the first material has a higher density than the second material.

* * * * *